(12) United States Patent
Fujii

(10) Patent No.: US 8,835,564 B2
(45) Date of Patent: Sep. 16, 2014

(54) METHOD FOR PRODUCING MODIFIED CONJUGATED DIENE-BASED POLYMER, AND METHOD FOR PRODUCING POLYMER COMPOSITION

(71) Applicant: Sumimoto Chemical Company, Limited, Tokyo (JP)

(72) Inventor: Mana Fujii, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/034,648

(22) Filed: Sep. 24, 2013

(65) Prior Publication Data

US 2014/0088256 A1  Mar. 27, 2014

(30) Foreign Application Priority Data

Sep. 26, 2012  (JP) .................. 2012-211886

(51) Int. Cl.
| | |
|---|---|
| C08F 236/10 | (2006.01) |
| C08F 8/30 | (2006.01) |
| C08C 19/44 | (2006.01) |
| B60C 1/00 | (2006.01) |
| C08K 3/36 | (2006.01) |

(52) U.S. Cl.
CPC ............ *C08F 236/10* (2013.01); *Y02T 10/862* (2013.01); *C08C 19/44* (2013.01); *B60C 1/00* (2013.01); *C08K 3/36* (2013.01)
USPC ........................... 525/105; 525/375; 525/575

(58) Field of Classification Search
None
See application file for complete search history.

(56) References Cited

U.S. PATENT DOCUMENTS

| | | | | |
|---|---|---|---|---|
| 4,097,557 | A | * | 6/1978 | Cunningham ................. 525/250 |
| 4,647,625 | A | * | 3/1987 | Aonuma et al. .............. 525/232 |
| 5,218,023 | A | * | 6/1993 | Horikawa et al. ............. 524/210 |
| 5,652,310 | A | | 7/1997 | Hsu et al. |
| 5,658,987 | A | * | 8/1997 | Nakamura et al. .............. 525/99 |
| 6,057,397 | A | | 5/2000 | Takagishi et al. |
| 6,111,045 | A | * | 8/2000 | Takagishi et al. ............. 526/338 |
| 6,211,321 | B1 | * | 4/2001 | Takagishi et al. ............. 526/335 |
| 7,683,111 | B2 | * | 3/2010 | Hogan et al. .................. 524/106 |
| 8,071,676 | B2 | * | 12/2011 | Matsuda et al. .............. 524/572 |
| 8,299,179 | B2 | * | 10/2012 | Ito et al. ........................ 525/102 |
| 8,334,339 | B2 | * | 12/2012 | Ito et al. ........................ 524/547 |
| 8,367,765 | B2 | * | 2/2013 | Ito et al. ........................ 524/547 |
| 2004/0132907 | A1 | * | 7/2004 | Nakamura et al. .............. 525/88 |
| 2005/0256264 | A1 | * | 11/2005 | Suzuki et al. ................... 525/88 |
| 2012/0252966 | A1 | | 10/2012 | Ito |

FOREIGN PATENT DOCUMENTS

JP   H10-007702 A   1/1998

\* cited by examiner

*Primary Examiner* — Robert S Loewe
(74) *Attorney, Agent, or Firm* — Panitch Schwarze Belisario & Nadel LLP

(57) ABSTRACT

The present invention relates to a method for producing a modified conjugated diene-based polymer, the method comprising a step of reacting a conjugated diene-based polymer with an organometallic compound, and a step of reacting the resulting product and an epoxy compound.

4 Claims, No Drawings

METHOD FOR PRODUCING MODIFIED CONJUGATED DIENE-BASED POLYMER, AND METHOD FOR PRODUCING POLYMER COMPOSITION

BACKGROUND OF THE INVENTION

1. Field of the Invention

The present invention relates to a method for producing a modified conjugated diene-based polymer and a method for producing a polymer composition using the polymer.

2. Background Art

In recent years, with an increase of interest in the environmental problems, improvement in fuel economy has strongly been required on automobiles, and a rubber composition to be used for automotive tires is also required to be superior in fuel economy. As a rubber composition for automotive tires, rubber compositions containing a conjugated diene-based polymer such as polybutadiene or a styrene-butadiene copolymer, and a reinforcing agent are used. The use of a silica reinforcing agent in place of carbon black, which has heretofore been used as a reinforcing agent, has been studied in order to improve performance se a rubber composition for tires.

Silica reinforcing agents are lower in affinity with conjugated diene-based polymers as compared with carbon black. Improvement in fuel economy has believed to require to enhance affinity between silica reinforcing agents and conjugated diene-based polymers. In order to enhance affinity between silica reinforcing agents and conjugated diene-based polymers, JP-A-10-7702, for example, proposes a method in which isoprene and butadiene are polymerized using n-butyllithium, n-butyllithium is then reacted with the resulting polymer to perform metallization of a vinyl group possessed by a side chain of the polymer, and thereafter chloropropyltriethoxysilane is reacted with the resultant metalized polymer to obtain a modified conjugated diene-based polymer.

SUMMARY OF THE INVENTION

Rubber compositions containing modified conjugated diene-based polymers produced by the above-cited method disclosed JP-A-10-7702, however, are still unsatisfactory in fuel economy and gripping properties.

Under such circumstances, the problem to be solved by the present invention is to provide a method for producing a modified conjugated diene-based polymer capable of affording a polymer composition superior in fuel economy and gripping properties, and a method for producing a polymer composition using the polymer.

The present invention relates to a method for producing a modified conjugated diene-based polymer, the method comprising a step of reacting a conjugated diene-based polymer having monomer units derived from a conjugated diene compound, monomer units derived from a compound represented by Formula (1) and monomer units derived from a compound represented by Formula (2), with an organometallic compound, and a step of reacting the resulting product and an epoxy compound, wherein the conjugated diene-based polymer comprises the monomer units derived from the compound represented by Formula (1) in a content of from 0.01% by weight to 1% by weight where the total amount of all the monomer units contained in the conjugated diene-based polymer is taken as 100% by weight;

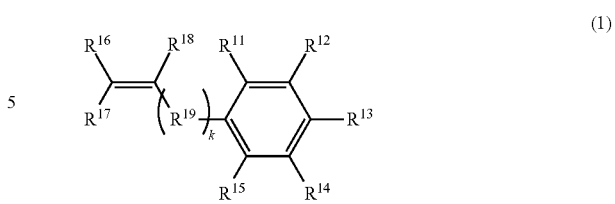

wherein $R^{11}$, $R^{12}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$, $R^{17}$ and $R^{18}$ each independently represent a hydrogen atom or a hydrocarbyl group; $R^{19}$ represents a hydrocarbylene group; k is 0 or 1,

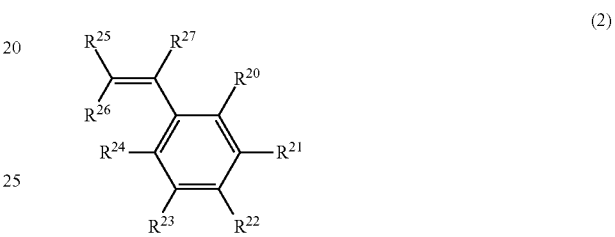

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $F^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group.

A second aspect of the present invention relates to a method for producing a polymer composition, the method comprising a step of kneading 100 parts by weight of a modified conjugated diene-based polymer produced by the above-mentioned method with from 10 to 150 parts by weight of a reinforcing agent.

According to the present invention, polymer compositions superior in fuel economy and gripping properties can be obtained.

DETAILED DESCRIPTION OF THE PREFERRED EMBODIMENTS

In the present specification, a hydrocarbyl group represents a monovalent group obtained by removing one hydrogen atom from a hydrocarbon. A hydrocarbylene group represents a divalent group obtained by removing two hydrogen atoms from a hydrocarbon. A hydrocarbyloxy group represents a monovalent group having a structure in which a hydrogen atom of a hydroxy group has been substituted with a hydrocarbyl group. An amino group having a substituent (hereinafter sometimes referred to as a substituted amino group) represents a group having a structure in which at least one hydrogen atom of an amino group has been substituted with a monovalent atom or a monovalent group other than a hydrogen atom, or a group having a structure in which two hydrogen atoms of an amino group have been substituted with a divalent group. A hydrocarbyl group having a substituent (hereinafter sometimes referred to as a substituted hydrocarbyl group) represents a monovalent group having a structure in which at least one hydrogen atom of a hydrocarbyl group has been substituted with a substituent. A hydrocarbylene group having a heteroatom (hereinafter sometimes referred to as a heteroatom-containing hydrocarbylene group) represents a divalent group having a structure in which a carbon atom other than a carbon atom from which a hydrogen atom has been removed, and/or a hydrogen atom of a hydrocarbylene group has been substituted with a group having a heteroatom (an atom other than a carbon atom and a hydrogen atom). A hydrocarbyloxysilane compound represents a compound having a structure in which at least one hydrocarbyloxy group is bound to a silicon atom.

[Process for Producing Modified Conjugated Diene-Based Polymer]

The method for producing a modified conjugated diene-based polymer of the present invention relates to a method comprising a step of reacting a conjugated diene-based polymer having monomer units derived from a conjugated diene compound, monomer units derived from a compound represented by Formula (1) and monomer units derived from a compound represented by Formula (2), with an organometallic compound, and a step of reacting the resulting product and an epoxy compound, wherein the conjugated diene-based polymer comprises the monomer units derived from the compound represented by Formula (1) in a content of from 0.01% by weight to 1% by weight where the total amount of all the monomer units contained in the conjugated diene-based polymer is taken as 100% by weight;

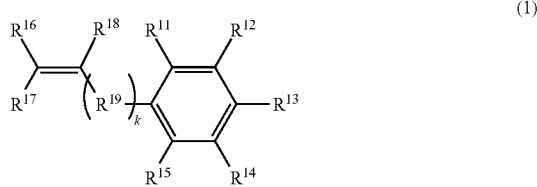
(1)

wherein $R^{11}$, $R^{12}$, $R^{13}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$, $R^{17}$ and $R^{18}$ each independently represent a hydrogen atom or a hydrocarbyl group; $R^{19}$ represents a hydrocarbylene group; k is 0 or 1,

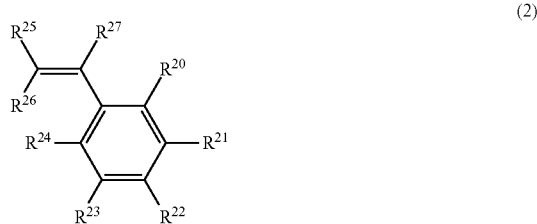
(2)

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $R^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group.

<Conjugated Diene-Based Polymer>

The conjugated diene-based polymer has monomer units derived from a conjugated diene compound, monomer units derived from a compound represented by Formula (1), and monomer units derived from a compound represented by Formula (2).

Examples of the conjugated diene compound include 1,3-butadiene, isoprene, 1,3-pentadiene, 2,5-dimethyl-1,3-butadiene, and 1,3-hexadiene. One or more members of them are used. 1,3-Butadiene or isoprene is preferred.

In Formula (1), $R^{11}$, $R^{12}$, $R^{13}$, $R^{14}$ and $R^{15}$ each independently represent a hydrogen atom or an alkyl group, and at least one of $R^{11}$, $R^{12}$, $R^{13}$, $R^{14}$ and $R^{15}$ is an alkyl group.

The number of the carbon atoms of each of the alkyl groups $R^{11}$, $R^{12}$, $R^{13}$, $R^{14}$ and $R^{15}$ is preferably 1 to 8, more preferably 1 to 5, even more preferably 1 to 2, particularly preferably 1.

Examples of the alkyl groups of $R^{11}$, $R^{12}$, $R^{13}$, $R^{14}$ and $R^{15}$ include a methyl group, an ethyl group, a propyl group, an isopropyl group, a butyl group, an isobutyl group, a sec-butyl group, a pentyl group, a hexyl group, a heptyl group, and an octyl group.

Each of the alkyl groups of $R^{11}$, $R^{12}$, $R^{13}$, $R^{14}$ and $R^{15}$ is preferably an alkyl group which is bound to a benzene ring via a carbon atom to which one or more hydrogen atoms are bound, more preferably an alkyl group which is bound to a benzene ring via a carbon atom to which two or more hydrogen atoms are bound, even more preferably a linear alkyl group.

Each of the alkyl groups of $R^{11}$, $R^{12}$, $R^{13}$, $R^{14}$ and $R^{15}$ is preferably a methyl group, an ethyl group, a n-propyl group, a n-butyl group, or a n-pentyl group, more preferably a methyl group or an ethyl group, even more preferably a methyl group.

Preferably, one to three groups selected from $R^{11}$, $R^{12}$, $R^{13}$, $R^{14}$ and $R^{15}$ are alkyl groups, and the remaining groups are hydrogen atoms. More preferably, one or two groups selected from $R^{11}$, $R^{12}$, $R^{13}$, $R^{14}$ and $R^{15}$ are alkyl groups, and the remaining groups are hydrogen atoms.

When one group selected from $R^{11}$, $R^{12}$, $R^{13}$, $R^{14}$ and $R^{15}$ is an alkyl group and the remaining four groups are hydrogen atoms, preferably any one group of $R^{12}$, $R^{13}$ and $R^{14}$ is an alkyl group and the remaining four groups are hydrogen atoms.

When two groups selected from $R^{11}$, $R^{12}$, $R^{13}$, $R^{14}$ and $R^{15}$ are alkyl groups and the remaining three groups are hydrogen atoms, preferably, $R^{11}$ and $R^{13}$ are alkyl groups and $R^{12}$, $R^{14}$ and $R^{15}$ are hydrogen atoms, or $R^{11}$ and $R^{14}$ are alkyl groups and $R^{12}$, $R^{13}$ and $R^{15}$ are hydrogen atoms, or $R^{12}$ and $R^{14}$ are alkyl groups and $R^{11}$, $R^{13}$ and $R^{15}$ are hydrogen atoms.

When three groups selected from $R^{11}$, $R^{12}$, $R^{13}$, $R^{14}$ and $R^{15}$ are alkyl groups and the remaining two groups are hydrogen atoms, preferably, $R^{11}$, $R^{13}$ and $R^{15}$ are alkyl groups and $R^{12}$ and $R^{14}$ are hydrogen atoms.

In Formula (1), $R^{16}$, $R^{17}$ and $R^{18}$ each independently represent a hydrogen atom or a hydrocarbyl group. Examples of the hydrocarbyl group include an alkyl group, an alkenyl group, an aryl group, and an arylalkyl group. Examples of the alkyl group include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, and a n-octyl group. Examples of the alkenyl group include a vinyl group, a 1-propenyl group, 2-propenyl group, an isopropenyl group, and a 1-butenyl group. Examples of the aryl group include a phenyl group, a tolyl group, a xylyl group, and a naphthyl group. Examples of the arylalkyl group include a benzyl group and a 2-phenyl-1-ethyl group.

When $R^{16}$ or $R^{17}$ is a hydrocarbyl group, the $R^{16}$ or $R^{17}$ is preferably an alkyl group or an alkenyl group, more preferably an alkenyl group. When $R^{18}$ is a hydrocarbyl group, the $R^{18}$ is preferably an alkyl group, an alkenyl group, or an aryl group.

When $R^{16}$, $R^{17}$ or $R^{18}$ is a hydrocarbyl group, the number of the carbon atoms of the $R^{16}$, $R^{17}$ or $R^{18}$ is preferably 1 to 10. When $R^{16}$, $R^{17}$ or $R^{18}$ is an alkyl group, the number of the carbon atoms of the $R^{16}$, $R^{17}$ or $R^{18}$ is preferably 1 to 6, and more preferably 1 to 2; when $R^{16}$, $R^{17}$, or $R^{18}$ is an alkenyl group, the number of the carbon atoms of the $R^{16}$, $R^{17}$ or $R^{18}$ is preferably 2 to 6, and more preferably 2; and when $R^{16}$, $R^{17}$ or $R^{18}$ is an aryl group, the number of the carbon atoms of the $R^{16}$, $R^{17}$ or $R^{18}$ is more preferably 6 to 8.

$R^{16}$ or $R^{17}$ is preferably a hydrogen atom or an alkenyl group having 2 to 6 carbon atoms, more preferably a hydrogen, atom or a vinyl group, even more preferably a hydrogen atom.

$R^{18}$ is preferably a hydrogen atom, an alkyl group having 1 to 6 carbon atoms, an alkenyl group having 2 to 6 carbon atoms, or an aryl group having 6 to 8 carbon atoms, more preferably a hydrogen atom, a methyl group, a vinyl group, or a phenyl group, even more preferably a hydrogen atom.

In Formula (1), k represents 0 or 1, preferably 0.

In Formula (1), $R^{19}$ represents a hydrocarbylene group. Examples of the hydrocarbylene group include an alkanediyl group and an arylene group. Examples of the alkanediyl group include a methylene group and a polymethylene group. Examples of the polymethylene group include an ethylene group, a trimethylene group, a tetramethylene group, a pentamethylene group, and a hexamethylene group. Examples of the aryl ene group include a phenylene group.

The number of the carbon atoms of $R^{19}$ is preferably 1 to 8, more preferably 1 to 5, even more preferably 1 to 3.

$R^{19}$ is preferably an alkanediyl group having 1 to 8 carbon atoms, more preferably a methylene group, or a polymethylene group having 2 to 5 carbon atoms, even more preferably a methylene group, an ethylene group, or a trimethylene group.

Of the compounds represented by Formula (1), examples of a compound in which $R^{16}$, $R^{17}$ and $R^{18}$ are hydrogen atoms, k is 0, one group selected from $R^{11}$, $R^{12}$, $R^{13}$, $R^{14}$ and $R^{15}$ is an alkyl group and the remaining four groups are hydrogen atoms include 2-methylstyrene, 2-ethylstyrene, 2-propylstyrene, 2-butylstyrene, 2-pentylstyrene, 2-hexylstyrene, 3-methylstyrene, 3-ethylstyrene, 3-propylstyrene, 3-butylstyrene, 3-pentylstyrene, 3-hexylstyrene, 4-methylstyrene, 4-ethylstyrene, 4-propylstyrene, 4-butylstyrene, 4-pentylstyrene, and 4-hexylstyrene.

Of the compounds represented by Formula (1) examples of a compound in which and $R^{16}$, $R^{17}$ and $R^{18}$ are hydrogen atoms, k is 0, two groups selected from $R^{11}$, $R^{12}$, $R^{13}$, $R^{14}$ and $R^{15}$ are alkyl groups and the remaining three groups are hydrogen atoms include 2,3-dimethylstyrene, 2,3-diethylstyrene, 2,3-dipropylstyrene, 2,3-dibutylstyrene, 2,3-pentylstyrene, 2,3-hexylstyrene, 2-methyl-3-ethylstyrene, 2-ethyl-3-methylstyrene, 2,4-dimethylstyrene, 2,4-diethylstyrene, 2,4-dipropylstyrene, 2,4-dibutylstyrene, 2,4-dipentylstyrene, 2,4-dihexylstyrene, 2-methyl-4-ethylstyrene, 2-ethyl-4-methylstyrene, 2,5-dimethylstyrene, 2,5-diethylstyrene, 2,5-dipropylstyrene, 2,5-dibutylstyrene, 2,5-dipentylstyrene, 2,5-dihexylstyrene, 2-methyl-5-ethylstyrene, 2-ethyl-5-methylstyrene, 2,6-dimethylstyrene, 2,6-diethylstyrene, 2,6-dipropylstyrene, 2,6-dibutylstyrene, 2,6-dipentylstyrene, 2,6-dihexylstyrene, 2-methyl-6-ethylstyrene, 2-ethyl-6-methylstyrene, 3,4-dimethylstyrene, 3,4-diethylstyrene, 3,4-dipropylstyrene, 3,4-dibutylstyrene, 3,4-dipentylstyrene, 3,4-dihexylstyrene, 3-methyl-4-ethylstyrene, 3-ethyl-4-methylstyrene, 3,5-dimethylstyrene, 3,5-diethylstyrene, 3,5-dipropylstyrene, 3,5-dibutylstyrene, 3,5-dipentylstyrene, 3,5-dihexylstyrene, 3-methyl-5-ethylstyrene, and 3-ethyl-5-methylstyrene.

Of the compounds represented by Formula (1), examples of a compound in which $R^{16}$, $R^{17}$ and $R^{18}$ are hydrogen atoms, k is 0, three groups selected from $R^{11}$, $R^{12}$, $R^{13}$, $R^{14}$ and $R^{15}$ are alkyl groups and the remaining two groups are hydrogen atoms include 2,3,4-trimethylstyrene, 2,3,4-triethylstyrene, 2,3,4-tripropylstyrene, 2,3,4-tributylstyrene, 2,3,4-tripentylstyrene, 2,3,4-trihexylstyrene, 2,3,5-trimethylstyrene, 2,3,5-triethylstyrene, 2,3,5-tripropylstyrene, 2,3,5-tributylstyrene, 2,3,5-tripentylstyrene, 2,3,5-trihexylstyrene, 2,3,6-trimethylstyrene, 2,3,6-triethylstyrene, 2,3,6-tripropylstyrene, 2,3,6-tributylstyrene, 2,3,6-tripentylstyrene, 2,3,6-trihexylstyrene, 2,4,5-trimethylstyrene, 2,4,5-triethylstyrene, 2,4,5-tripropylstyrene, 2,4,5-tributylstyrene, 2,4,5-tripentylstyrene, 2,4,5-trihexylstyrene, 2,4,6-trimethylstyrene, 2,4,6-triethylstyrene, 2,4,6-tripropylstyrene, 2,4,6-tributylstyrene, 2,4,6-tripentylstyrene, 2,4,6-trihexylstyrene, 3,4,5-trimethylstyrene, 3,4,5-triethylstyrene, 3,4,5-tripropylstyrene, 3,4,5-tributylstyrene, 3,4,5-tripentylstyrene, and 3,4,5-trihexylstyrene.

Of the compounds represented by Formula (1), examples of a compound in which $R^{16}$, $R^{17}$ and $R^{18}$ are hydrogen atoms, k is 1, $R^{19}$ is a methylene group, one group selected from $R^{11}$, $R^{12}$, $R^{13}$, $R^{14}$ and $R^{15}$ is an alkyl group and the remaining four groups are hydrogen atoms include 2-methyl-1-(2-propenyl)benzene, 2-ethyl-1-(2-propenyl)benzene, 2-propyl-1-(2-propenyl)benzene, 2-butyl-1-(2-propenyl)benzene, 3-methyl-1-(2-propenyl)benzene, 3-ethyl-1-(2-propenyl)benzene, 3-propyl-1-(2-propenyl)benzene, 3-butyl-1-(2-propenyl)benzene, 4-methyl-1-(2-propenyl)benzene, 4-ethyl-1-(2-propenyl)benzene, 4-propyl-1-(2-propenyl)benzene, and 4-butyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is a methylene group, two groups selected from $R^{11}$, $R^{12}$, $R^{13}$, $R^{14}$ and $R^{15}$ are alkyl groups having 1 to 8 carbon atoms and the remaining three groups are hydrogen atoms include
2,3-dimethyl-1-(2-propenyl)benzene,
2,3-diethyl-1-(2-propenyl)benzene,
2,3-dipropyl-1-(2-propenyl)benzene,
2,3-dibutyl-1-(2-propenyl)benzene,
2,4-dimethyl-1-(2-propenyl)benzene,
2,4-diethyl-1-(2-propenyl)benzene,
2,4-dipropyl-1-(2-propenyl)benzene,
2,4-dibutyl-1-(2-propenyl)benzene,
2,5-dimethyl-1-(2-propenyl)benzene,
2,5-diethyl-1-(2-propenyl)benzene,
2,5-dipropyl-1-(2-propenyl)benzene,
2,5-dibutyl-1-(2-propenyl)benzene,
2,6-dimethyl-1-(2-propenyl)benzene,
2,6-diethyl-1-(2-propenyl)benzene,
2,6-dipropyl-1-(2-propenyl)benzene,
2,6-dibutyl-1-(2-propenyl)benzene,
3,4-dimethyl-1-(2-propenyl)benzene,
3,4-diethyl-1-(2-propenyl)benzene,
3,4-dipropyl-1-(2-propenyl)benzene,
3,4-dibutyl-1-(2-propenyl)benzene,
3,5-dimethyl-1-(2-propenyl)benzene,
3,5-diethyl-1-(2-propenyl)benzene,
3,5-dipropyl-1-(2-propenyl)benzene, and
3,5-dibutyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is a methylene group, three groups selected from $R^{11}$, $R^{12}$, $R^{13}$, $R^{14}$ and $R^{15}$ are alkyl groups and the remaining two groups are hydrogen atoms include
2,3,4-trimethyl-1-(2-propenyl)benzene,
2,3,4-triethyl-1-(2-propenyl)benzene,
2,3,5-trimethyl-1-(2-propenyl)benzene,
2,3,5-triethyl-1-(2-propenyl)benzene,
2,3,6-trimethyl-1-(2-propenyl)benzene,
2,3,6-triethyl-1-(2-propenyl)benzene,
2,4,5-trimethyl-1-(2-propenyl)benzene,
2,4,5-triethyl-1-(2-propenyl)benzene,
2,4,6-trimethyl-1-(2-propenyl)benzene,
2,4,6-triethyl-1-(2-propenyl)benzene,
3,4,5-trimethyl-1-(2-propenyl)benzene, and
3,4,5-triethyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is an ethylene group, one group selected from $R^{11}$, $R^{12}$, $R^{13}$, $R^{14}$ and $R^{15}$ is an alkyl group and the remaining four groups are hydrogen atoms include 2-methyl-1-(3-butenyl)benzene, 2-ethyl-1-(3-butenyl)benzene, 2-propyl-1-(3-butenyl)benzene, 2-butyl-1-(5-butenyl)benzene, 3-methyl-1-(3-butenyl)benzene, 3-ethyl-1-(3-butenyl)benzene, 3-propyl-1-(3-butenyl)benzene, 3-butyl-1-(3-butenyl)benzene, 4-methyl-1-(3-butenyl)benzene, 4-ethyl-1-(3-butenyl)benzene, 4-propyl-1-(3-butenyl)benzene, and 4-butyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is an ethylene group, two groups selected from $R^{11}$, $R^{12}$, $R^{13}$, $R^{14}$ and $R^{15}$ are alkyl groups and the remaining three groups are hydrogen atoms include 2,3-dimethyl-1-(3-butenyl)benzene, 2,3-diethyl-1-(3-butenyl)benzene, 2,3-dipropyl-1-(3-butenyl)benzene, 2,3-dibutyl-1-(3-butenyl)benzene, 2,4-dimethyl-1-(3-butenyl)benzene, 2,4-diethyl-1-(3-butenyl)benzene, 2,4-dipropyl-1-(3-butenyl)benzene, 2,4-dibutyl-1-(3-butenyl)benzene, 2,5-dimethyl-1-(3-butenyl)benzene, 2,5-diethyl-1-(3-butenyl)benzene, 2,5-dipropyl-1-(3-butenyl)benzene, 2,5-dibutyl-1-(3-butenyl)benzene, 2,6-dimethyl-1-(3-butenyl)benzene, 2,6-diethyl-1-(3-butenyl)benzene, 2,6-dipropyl-1-(3-butenyl)benzene, 2,6-dibutyl-1-(3-butenyl)benzene, 3,4-dimethyl-1-(3-butenyl)benzene, 3,4-diethyl-1-(3-butenyl)benzene, 3,4-dipropyl-1-(3-butenyl)benzene, 3,4-dibutyl-1-(3-butenyl)benzene, 3,5-dimethyl-1-(3-butenyl)benzene, 3,5-diethyl-1-(3-butenyl)benzene, 3,5-dipropyl-1-(3-butenyl)benzene, and 3,5-dibutyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is an ethylene group, three groups selected from $R^{11}$, $R^{12}$, $R^{13}$, $R^{14}$ and $R^{15}$ are alkyl groups and the remaining two groups are hydrogen atoms include
2,3,4-trimethyl-1-(3-butenyl)benzene,
2,3,4-triethyl-1-(3-butenyl)benzene,
2,3,5-trimethyl-1-(3-butenyl)benzene,
2,3,5-triethyl-1-(3-butenyl)benzene,
2,3,6-trimethyl-1-(3-butenyl)benzene,
2,3,6-triethyl-1-(3-butenyl)benzene,
2,4,5-trimethyl-1-(3-butenyl)benzene,
2,4,5-triethyl-1-(3-butenyl)benzene,
2,4,6-trimethyl-1-(3-butenyl)benzene,
2,4,6-triethyl-1-(3-butenyl)benzene,
3,4,5-trimethyl-1-(3-butenyl)benzene, and
3,4,5-triethyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is a trimethylene group, one group selected from $R^{11}$, $R^{12}$, $R^{13}$, $R^{14}$ and $R^{15}$ is an alkyl group and the remaining four groups are hydrogen atoms include 2-methyl-1-(4-pentenyl)benzene, 2-ethyl-1-(4-pentenyl)benzene, 2-propyl-1-(4-pentenyl)benzene, 2-butyl-1-(4-pentenyl)benzene, 3-methyl-1-(4-pentenyl)benzene, 3-ethyl-1-(4-pentenyl)benzene, 3-propyl-1-(4-pentenyl)benzene, 3-butyl-1-(4-pentenyl)benzene, 4-methyl-1-(4-pentenyl)benzene, 4-ethyl-1-(4-pentenyl)benzene, 4-propyl-1-(4-pentenyl)benzene, and 4-butyl-1-(4-pentenyl)benzene.

Of the compounds represented by Formula (1), examples of a compound in which $R^{16}$, $R^{17}$ and $R^{18}$ are hydrogen atoms, k is 1, $R^{19}$ is an ethylene group, two groups selected from $R^{11}$, $R^{12}$, $R^{13}$, $R^{14}$ and $R^{15}$ are alkyl groups and the remaining three groups are hydrogen atoms include 2,3-dimethyl-1-(4-pentenyl)benzene, 2,3-diethyl-1-(4-pentenyl)benzene, 2,3-dipropyl-1-(4-pentenyl)benzene, 2,3-dibutyl-1-(4-pentenyl)benzene, 2,4-dimethyl-1-(4-pentenyl)benzene, 2,4-diethyl-1-(4-pentenyl)benzene, 2,4-dipropyl-1-(4-pentenyl)benzene, 2,4-dibutyl-1-(4-pentenyl)benzene, 2,5-dimethyl-1-(4-pentenyl)benzene, 2,5-diethyl-1-(4-pentenyl)benzene, 2,5-dipropyl-1-(4-pentenyl)benzene, 2,5-dibutyl-1-(4-pentenyl)benzene, 2,6-dimethyl-1-(4-pentenyl)benzene, 2,6-diethyl-1-(4-pentenyl)benzene, 2,6-dipropyl-1-(4-pentenyl)benzene, 2,6-dibutyl-1-(4-pentenyl)benzene, 3,4-dimethyl-1-(4-pentenyl)benzene, 3,4-diethyl-1-(4-pentenylbenzene, 3,4-dipropyl-1-(4-pentenyl)benzene, 3,4-dibutyl-1-(4-pentenyl)benzene, 3,5-dimethyl-1-(4-pentenyl)benzene, 3,5-diethyl-1-(4-pentenyl)benzene, 3,5-dipropyl-1-(4-pentenyl)benzene, and 3,5-dibutyl-1-(4-pentenyl)benzene.

Of the compounds represented by Formula (1), examples of a compound in which $R^{16}$, $R^{17}$ and $R^{18}$ are hydrogen atoms, k is 1, $R^{19}$ is an ethylene group, three groups selected from $R^{11}$, $R^{12}$, $R^{13}$, $R^{14}$ and $R^{15}$ are alkyl groups and the remaining two groups are hydrogen atoms include
2,3,4-trimethyl-1-(4-pentenyl)benzene,
2,3,4-triethyl-1-(4-pentenyl)benzene,
2,3,5-trimethyl-1-(4-pentenyl)benzene,
2,3,5-triethyl-1-(4-pentenyl)benzene,
2,3,6-trimethyl-1-(4-pentenyl)benzene,
2,3,6-triethyl-1-(4-pentenyl)benzene,
2,4,5-trimethyl-1-(4-pentenyl)benzene,
2,4,5-triethyl-1-(4-pentenyl)benzene,
2,4,6-trimethyl-1-(4-pentenyl)benzene,
2,4,6-triethyl-1-(4-pentenyl)benzene,
3,4,5-trimethyl-1-(4-pentenyl)benzene, and
3,4,5-triethyl-1-(4-pentenyl)benzene.

Of the compounds represented by Formula (1), examples of a compound in which $R^{16}$ and $R^{17}$ are hydrogen atoms, $R^{18}$ is a methyl group, k is 0, one group selected from $R^{11}$, $R^{12}$, $R^{13}$, $R^{14}$ and $R^{15}$ is an alkyl group and the remaining four groups are hydrogen atoms include 2-methyl-1-isopropenylbenzene, 2-ethyl-1-isopropenylbenzene, 2-propyl-1-isopropenylbenzene, 2-butyl-1-isopropenylbenzene, 3-methyl-1-isopropenylbenzene, 3-ethyl-1-isopropenylbenzene, 3-propyl-1-isopropenylbenzene, 3-butyl-1-isopropenylbenzene, 4-methyl-1-isopropenylbenzene, 4-ethyl-1-isopropenylbenzene, 4-propyl-1-isopropenylbenzene, and 4-butyl-1-isopropenylbenzene.

Of the compounds represented by Formula (1), examples of a compound in which $R^{16}$ and $R^{17}$ are hydrogen atoms, $R^{18}$ is a vinyl group, k is 0, one group selected from $R^{11}$, $R^{12}$, $R^{13}$, $R^{14}$ and $R^{15}$ is an alkyl group and the remaining four groups are hydrogen atoms include 2-(2-methylphenyl)-1,3-butadiene, 2-(2-ethylphenyl)-1,3-butadiene, 2-(2-propylphenyl)-1, 3-butadiene, 2-(2-butylphenyl)-1,3-butadiene, 2-(3-methylphenyl)-1,3-butadiene, 2-(3-ethylphenyl)-1,3-butadiene, 2-(3-propylphenyl)-1,3-butadiene, 2-(3-butylphenyl)-1,3-butadiene, 2-(4-methylphenyl)-1,3-butadiene, 2-(4-ethylphenyl)-1,3-butadiene, 2-(4-propylphenyl)-1,3-butadiene, and 2-(4-butylphenyl)-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is a methylene group, one group selected from $R^{11}$, $R^{12}$, $R^{13}$, $R^{14}$ and $R^{15}$ is an alkyl group and the remaining four groups are hydrogen atoms include
2-(2-methylphenyl)methyl-1,3-butadiene,
2-(2-ethylphenyl)methyl-1,3-butadiene,
2-(2-propylphenyl)methyl-1,3-butadiene,
2-(2-butylphenyl)methyl-1,3-butadiene,
2-(3-methylphenyl)methyl-1,3-butadiene,
2-(3-ethylphenyl)methyl-1,3-butadiene,
2-(3-propylphenyl)methyl-1,3-butadiene,
2-(3-butylphenyl)methyl-1,3-butadiene,
2-(4-methylphenyl)methyl-1,3-butadiene,
2-(4-ethylphenyl)methyl-1,3-butadiene,
2-(4-propylphenyl)methyl-1,3-butadiene, and
2-(4-butylphenyl)methyl-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is an ethylene group, one group selected from $R^{11}$, $R^{12}$, $R^{13}$, $R^{14}$ and $R^{15}$ is an alkyl group and the remaining four groups are hydrogen atoms include
2-[2-(2-methylphenyl)ethyl]-1,3-butadiene,
2-[2-(2-ethylphenyl)ethyl]-1,3-butadiene,
2-[2-(2-propylphenyl)ethyl]-1,3-butadiene,
2-[2-(2-butylphenyl)ethyl]-1,3-butadiene,
2-[2-(3-methylphenyl)ethyl]-1,3-butadiene,
2-[2-(3-ethylphenyl)ethyl]-1,3-butadiene,
2-[2-(3-propylphenyl)ethyl]-1,3-butadiene,
2-[2-(3-butylphenyl)ethyl]-1,3-butadiene,
2-[2-(4-methylphenyl)ethyl]-1,3-butadiene,
2-[2-(4-ethylphenyl)ethyl]-1,3-butadiene,
2-[2-(4-propylphenyl)ethyl]-1,3-butadiene, and
2-[2-(4-butylphenyl)ethyl]-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is a trimethylene group, one group selected from $R^{11}$, $R^{12}$, $R^{13}$, $R^{14}$ and $R^{15}$ is an alkyl group and the remaining four groups are hydrogen atoms include
2-[3-(2-methylphenyl)propyl]-1,3-butadiene,
2-[3-(2-ethylphenyl)propyl]-1,3-butadiene,
2-[3-(2-propylphenyl)propyl]-1,3-butadiene,
2-[3-(2-butylphenyl)propyl]-1,3-butadiene,
2-[3-(3-methylphenyl)propyl]-1,3-butadiene,
2-[3-(3-ethylphenyl)propyl]-1,3-butadiene,
2-[3-(3-propylphenyl)propyl]-1,3-butadiene,
2-[3-(3-butylphenyl)propyl]-1,3-butadiene,
2-[3-(4-methylphenyl)propyl]-1,3-butadiene,
2-[3-(4-ethylphenyl)propyl]-1,3-butadiene,
2-[3-(4-propylphenyl)propyl]-1,3-butadiene, and
2-[3-(4-butylphenyl)propyl]-1,3-butadiene.

Of the compounds represented by Formula (1), examples of a compound in which $R^{16}$ and $R^{17}$ are hydrogen atoms, $R^{18}$ is a phenyl group, k is 0, one group selected from $R^{11}$, $R^{12}$, $R^{13}$, $R^{14}$ and $R^{15}$ is an alkyl group and the remaining four groups are hydrogen atoms include 1-(2-methylphenyl)-1-phenylethylene,
1-(2-ethylphenyl)-1-phenylethylene,
1-(2-propylphenyl)-1-phenylethylene,
1-(2-butylphenyl)-1-phenylethylene,
1-(3-methylphenyl)-1-phenylethylene,
1-(3-ethylphenyl)-1-phenylethylene,
1-(3-propylphenyl)-1-phenylethylene,
1-(3-butylphenyl)-1-phenylethylene,
1-(4-methylphenyl)-1-phenylethylene,
1-(4-ethylphenyl)-1-phenylethylene,
1-(4-propylphenyl)-1-phenylethylene, and
1-(4-butylphenyl)-1-phenylethylene.

Of the compounds represented by Formula (1), examples of a compound in which $R^{16}$ and $R^{17}$ are hydrogen atoms, $R^{18}$ is a 4-tolyl group, k is 0, one group selected from $R^{11}$, $R^{12}$, $R^{13}$, $R^{14}$ and $R^{15}$ is an alkyl group and the remaining four groups are hydrogen atoms include 1,1-bis(4-methylphenyl)ethylene, 1,1-bis(4-ethylphenyl)ethylene, 1,1-bis(4-propylphenyl)ethylene, and 1,1-bis(4-butylphenyl)ethylene.

Of the compounds represented by Formula (1), examples of a compound in which $R^{16}$ is a vinyl group, $R^{17}$ and $R^{18}$ are hydrogen atoms, k is 0, one group selected from $R^{11}$, $R^{12}$, $R^{13}$, $R^{14}$ and $R^{15}$ is an alkyl group and the remaining four groups are hydrogen atoms include 1-(2-methylphenyl)-1,3-butadiene, 1-(2-ethylphenyl)-1,3-butadiene, 1-(2-propylphenyl)-1,3-butadiene, 1-(2-butylphenyl)-1,3-butadiene, 1-(3-methylphenyl)-1,3-butadiene, 1-(3-ethylphenyl)-1,3-butadiene, 1-(3-propylphenyl)-1,3-butadiene, 1-(3-butylphenyl)-1,3-butadiene, 1-(4-methylphenyl)-1,3-butadiene, 1-(4-ethylphenyl)-1,3-butadiene, 1-(4-propylphenyl)-1,3-butadiene, and 1-(4-butylphenyl)-1,3-butadiene.

The compound represented by Formula (1) is preferably a compound in which $R^{11}$, $R^{12}$, $R^{13}$, $R^{14}$ and $R^{15}$ is a hydrogen atom or an alkyl group having 1 to 8 carbon atoms, at least one of $R^{11}$, $R^{12}$, $R^{13}$, $R^{14}$ and $R^{15}$ is an alkyl group having 1 to 8 carbon atoms, $R^{16}$, $R^{17}$ and $R^{18}$ are hydrogen atoms, and k is 0. More preferred is a compound in which $R^{11}$, $R^{12}$, $R^{13}$, $R^{14}$ and $R^{15}$ is a hydrogen atom or an alkyl group having 1 to 5 carbon atoms, at least one of $R^{11}$, $R^{12}$, $R^{13}$, $R^{14}$ and $R^{15}$ is an alkyl group having 1 to 5 carbon atoms which is bound to a benzene ring via a carbon atom with two or more of hydrogen atoms bound thereto, $R^{16}$, $R^{17}$ and $R^{18}$ are hydrogen atoms, and k is 0. Even more preferred is a compound in which one to three groups selected from $R^{11}$, $R^{12}$, $R^{13}$, $R^{14}$ and $R^{15}$ are each a methyl group or an ethyl group, the remaining groups are hydrogen atoms, $R^{16}$, $R^{17}$ and $R^{18}$ are hydrogen atoms, and k is 0. Particularly preferred is a compound in which one or two groups selected from $R^{11}$, $R^{12}$, $R^{13}$, $R^{14}$ and $R^{15}$ are each a methyl croup or an ethyl group, the remaining groups are hydrogen atoms, $R^{16}$, $R^{17}$ and $R^{18}$ are hydrogen atoms, and k is 0.

The compound represented by Formula (1) is most preferably 3-methylstyrene, 3-ethylstyrene, 4-methylstyrene, 4-ethylstyrene, 2,4-dimethylstyrene, 2,4-diethylstyrene, 2,5-dimethylstyrene, 2,5-diethylstyrene, 3,5-dimethylstyrene, or 3,5-diethylstyrene.

Two or more compounds represented by Formula (1) may be used.

In the conjugated diene-based polymer, the content of the monomer unit derived from the compound represented by Formula (1) is from 0.01% by weight to 1% by weight where the total amount of the monomer units contained in the conjugated diene-based polymer is taken as 100% by weight, and in order to enhance fuel economy, gripping properties, and tensile strength at break, it is preferably 0.02% by weight or more, more preferably 0.05% by weight or more, and even more preferably 0.1% by weight or more. Moreover, it is preferably 0.8% by weight or less, more preferably 0.5% by weight or less, and even more preferably 0.3% by weight or less.

Of the compounds represented by Formula (2), examples of a compound in which $R^{20}$, $R^{21}$, $R^{22}$, $R^{23}$, and $R^{24}$ are all hydrogen atoms include styrene, α-methylstyrene, α-ethylstyrene, and α-propylstyrene.

Of the compounds represented by Formula (2), examples of a compound in which two or more groups selected from $R^{20}$, $R^{21}$, $R^{22}$, $R^{23}$ and $R^{24}$ are linked to form a ring consisting of carbon atoms together with the carbon atoms to which the groups are attached, and each of the rest of $R^{20}$, $R^{21}$, $R^{22}$, $R^{23}$ and $R^{24}$ is a hydrogen atom include vinylnaphthalene, vinylanthracene, vinylindene, and vinylphenanthrene.

Preferred as a compound represented by Formula (2) are styrene, α-methylstyrene, and vinylnaphthalene, and more preferred is styrene. Two or more compounds represented by Formula (2) may be used.

In the conjugated diene-based polymer, the content of the monomer unit derived from the compound represented by Formula (2) is preferably 10% by weight or more, more preferably 15% by weight or more where the total amount of the monomer units contained in the conjugated diene-based polymer is taken as 100% by weight. This content is preferably 50% by weight or less, more preferably 45% by weight or less. Adjusting the content to 10% by weight or more can enhance gripping properties and tensile strength at break.

In the conjugated diene-based polymer, the content of the monomer unit derived from the conjugated diene compound is preferably 50% by weight or more, and more preferably 55% by weight or more where the total amount of the monomer units contained in the conjugated diene-based polymer is taken as 100% by weight. This content is preferably 90% by weight or less, and more preferably 85% by weight or less. Adjusting the content to 55% by weight or more can enhance fuel economy.

The conjugated diene-based polymer may have a nitrogen atom-containing group on at least one of polymer chain ends. Examples of the nitrogen atom-containing group include a substituted amino group and a nitrogen-containing heterocyclic group.

<Method for Producing Conjugated Diene-Based Polymer>

Preferably, the conjugated diene-based polymer is obtained by polymerizing monomer components comprising a conjugated diene compound, a compound represented by Formula (1), and a compound represented by Formula (2) using an organometallic compound in a hydrocarbon solvent.

The hydrocarbon solvent is a solvent which does not inactivate organometallic compounds. Examples of the hydrocarbon solvent include aliphatic hydrocarbons such as propane, butane, isobutane, pentane, isopentane and hexane; aromatic hydrocarbons such as benzene, toluene, xylene and ethylbenzene; and alicyclic hydrocarbons such as cyclopentane and cyclohexane. One or more members of them are used.

The polymerization of the monomer components may be performed in the presence of an agent for adjusting the amount of vinyl bonds of monomer units derived from the conjugated diene compound, and an agent for adjusting the distribution of monomer units derived from the conjugated diene compound and monomer units derived from a compound other than the conjugated diene compound in a conjugated diene-based polymer chain (hereinafter, collectively referred to as an "adjusting agent"). Examples of the adjusting agent include ether compounds, tertiary amines, phosphine compounds, alkali metal alkoxides, and alkali metal phenoxides. Examples of the ether compounds include cyclic ethers, such as tetrahydrofuran, tetrahydropyran, and 1,4-dioxane; aliphatic monoethers, such as diethyl ether and dibutyl ether; aliphatic diethers, such as ethylene glycol dimethyl ether, ethylene glycol diethyl ether, and ethylene glycol dibutyl ether; aliphatic triethers, such as diethylene glycol diethyl ether and diethylene glycol dibutyl ether; and aromatic ethers, such as diphenyl ether and anisole. Examples of the tertiary amines include triethylamine, tripropylamine, tributylamine, 1,1,2,2-tetramethylethylenediamine, N,N-diethylaniline, pyridine, and quinoline. Examples of the phosphine compounds include trimethylphosphine, triethylphosphine, and triphenylphosphine. Examples of the alkali metal alkoxides include sodium tert-butoxide, potassium tert-butoxide, sodium tert-pentoxide, and potassium tert-pentoxide. Examples of the alkali metal phenoxides include sodium phenoxide and potassium phenoxide. Two or more adjusting agents may be used.

In order to enhance fuel economy, gripping properties, and tensile strength at break, the amount of use of the compound represented by Formula (1) in the polymerization of monomer components is preferably 0.01% by weight or more, more preferably 0.02% by weight or more, even more preferably 0.05% by weight or more, and further preferably 0.1% by weight or more where the total usage amount of the monomer components in the polymerization is taken as 100% by weight. It is preferably 1% by weight or less, more preferably 0.8% by weight or less, even more preferably 0.5% by weight or less, and further preferably 0.3% by weight or less.

Examples of the organometallic compound to be used for obtaining the conjugated diene-based polymer by polymerizing the monomer components include organoalkali metal compounds such as an organolithium compound, an organosodium compound, an organopotassium compound, an organorubidium compound, and an organocesium compound. Examples of the organolithium compound include a hydrocarbyllithium compound and a hydrocarbylenedilithium compound. Examples of the organosodium compound include sodium naphthalenide and sodium biphenylide. Examples of the organopotassium compound include potassium naphthalenide.

Examples of the hydrocarbyllithium compound include alkyllithium compounds such as methyllithium, ethyllithium, propyllithium, isopropyllithium, n-butyllithium, isobutyllithium, sec-butyllithium, tert-butyllithium, tert-octyllithium, and n-decyllithium; aryllithium compounds such as phenyllithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllithium.

Examples of the hydrocarbylenedilithium compound include
1,4-dilithio-2-butene and
1,3-his (1-lithio-1,3-dimethylpentyl)benzene.

The amount of use of the organometallic compound to be used in the polymerization of the monomer components is preferably from 0.01 mmol to 15 mmol per 100 g of the monomer components to be used in the polymerization.

The conjugated diene-based polymer may be a conjugated diene-based polymer having a nitrogen atom-containing group on at least one of polymer chain ends. Examples of a method for producing the conjugated diene-based polymer include the following method (a) and method (b).

(a) A method for producing a conjugated diene-based polymer using an organoalkali metal compound having a nitrogen atom-containing group as an organometallic compound.

(b) A method of adding a modifying agent having a nitrogen atom-containing group to a polymerization solution containing a conjugated diene-based polymer resulting from polymerization, and reacting the modifying agent with an active end of the conjugated diene-based polymer.

Examples of preferred conjugated diene-based polymers having a nitrogen atom-containing group on at least one of polymer chain ends include a conjugated diene-based polymer produced by using an organoalkali metal compound having a nitrogen atom-containing group as an organometallic compound in polymerization, and adding an alcohol to a polymer solution containing a conjugated diene-based polymer resulting from the polymerization, thereby inactivating an active end of the polymer chain. A conjugated diene-based polymer composition superior also in tensile strength at break can be obtained by using the conjugated diene-based polymer.

Examples of preferred conjugated diene-based polymers having a nitrogen atom-containing group on at least one of polymer chain ends also include a conjugated diene-based polymer produced by using a hydrocarbyllithium compound as an organometallic compound in polymerization, and adding a modifying agent having a nitrogen atom-containing group to a polymer solution containing a conjugated diene-based polymer resulting from the polymerization, thereby reacting the modifying agent with an active end of the polymer chain. A conjugated diene-based polymer composition superior in gripping properties and fully satisfactory in tensile strength at break can be obtained by using the conjugated diene-based polymer.

Examples of preferred conjugated diene-based polymers having a nitrogen atom-containing group on at least one of polymer chain ends also include a conjugated diene-based polymer produced by using an organoalkali metal compound having a nitrogen atom-containing group as an organometallic compound in polymerization, and adding a modifying agent having a nitrogen atom-containing group to a polymer solution containing a conjugated diene-based polymer resulting from the polymerization, thereby reacting the modifying agent with an active end of the polymer chain.

In the above-mentioned method (a), examples of a preferred organoalkali metal compound having a nitrogen atom-containing group include a compound represented by the following Formula (3):

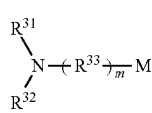

(3)

wherein M represents an alkali metal atom, $R^{31}$ and $R^{32}$ each independently represent a hydrocarbyl group optionally having a substituent, or a trihydrocarbylsilyl group, or $R^{31}$ and $R^{32}$ together represent a hydrocarbylene group optionally having a nitrogen atom and/or an oxygen atom formed by the binding of $R^{31}$ and $R^{32}$, $R^{33}$ represents a hydrocarbylene group, and m represents 0 or 1.

In Formula (3), M represents an alkali metal atom. Examples of the alkali metal atom include Li, Na, K, Rb and Cs, preferably Li.

In Formula (3), $R^{31}$ and $R^{32}$ each independently represent a hydrocarbyl group optionally having a substituent, or a trihydrocarbylsilyl group, or $R^{31}$ and $R^{32}$ together represent a hydrocarbylene group optionally having a nitrogen atom and/or an oxygen atom formed by the binding of $R^{31}$ and $R^{32}$.

In each of $R^{31}$ and $R^{32}$, the hydrocarbyl group optionally having a substituent is a hydrocarbyl group or a substituted hydrocarbyl group. Examples of the substituent in the substituted hydrocarbyl group include a substituted amino group or a hydrocarbyloxy group. Examples of the hydrocarbyl group include alkyl groups such as a methyl group, an ethyl group, a n-propyl group, an isopropyl group, a n-butyl group, an isobutyl group, a sec-butyl group, a tert-butyl group, a n-pentyl group, a n-hexyl group, a n-octyl group, and a n-dodecyl group; cycloalkyl groups such as a cyclopentyl group and a cyclohexyl group; aryl groups such as a phenyl group and a tolyl group; and arylalkyl groups such as a benzyl group. Examples of the substituted hydrocarbyl group in which the substituent is a substituted amino group include an N,N-dimethylaminomethyl group, a 2-N,N-dimethylaminoethyl group, and a 3-N,N-dimethylaminopropyl group. Examples of the substituted hydrocarbyl group in which the substituent is a hydrocarbyloxy group include a methoxymethyl group, a methoxyethyl group, and an ethoxymethyl group.

Examples of the trihydrocarbylsilyl group of each of $R^{31}$ and $R^{32}$ include a trimethylsilyl group and a tert-butyl-dimethylsilyl group.

The hydrocarbylene group optionally having a nitrogen atom and/or an oxygen atom formed by the binding of $R^{31}$ and $R^{32}$ is a hydrocarbylene group, or a hydrocarbylene group containing a nitrogen atom and/or an oxygen atom. Examples of the hydrocarbylene group containing a nitrogen atom and/or an oxygen atom include a hydrocarbylene group containing a nitrogen atom, a hydrocarbylene group containing an oxygen atom, and a hydrocarbylene group containing a nitrogen atom and an oxygen atom. Examples of the hydrocarbylene group include an alkanediyl group and an alkenediyl group. Examples of the alkanediyl group include polymethylene groups such as a tetramethylene group, a pentamethylene group, and a hexamethylene group; and a 2,2,4-trimethylhexane-1,6-diyl group. Examples of the alkanediyl group include a pentan-2-ene-1,5-diyl group. Examples of the hydrocarbylene group containing a nitrogen atom include a group represented by —CH=N—CH=CH— and a group represented by —CH=N—CH$_2$—CH$_2$—. Examples of the hydrocarbylene group containing an oxygen atom include a group represented by —CH$_2$—CH$_2$—O—CH$_2$—CH$_2$—.

When $R^{31}$ and $R^{32}$ are each a hydrocarbyl group, the number of the carbon atoms thereof is preferably 1 to 10, more preferably 1 to 4, respectively. When $R^{31}$ and $R^{32}$ are bound to form a hydrocarbylene group, the number of the carbon atoms of the hydrocarbylene group is preferably 3 to 20, more preferably 4 to 7.

$R^{31}$ and $R^{32}$ are each preferably a hydrocarbyl group or are together a hydrocarbylene group formed by the binding of $R^{31}$ and $R^{32}$, more preferably a linear alkyl group having 1 to 4 carbon atoms or are together a polymethylene group having 4 to 7 carbon atoms formed by the binding of $R^{31}$ and $R^{32}$.

$R^{31}$ and $R^{32}$ are further preferably a methyl group or an ethyl group.

In Formula (3), $R^{33}$ represents a hydrocarbylene group. Examples of the hydrocarbylene group as $R^{33}$ include an alkanediyl group, an alkenediyl group, and an arylene group. Examples of the alkanediyl group include a methylene group; polymethylene groups such as an ethylene group, a trimethylene group, a tetramethylene group, and a pentamethylene group; and a 2,2,4-trimethylhexane-1,6-diyl group. Examples of the alkanediyl group include a butan-2-ene-1,4-diyl group, a 2-methylbutan-2-ene-1,4-diyl group, and a pentan-2-ene-1,5-diyl group. Examples of the arylene group include a 1,2-phenylene group, a 1,3-phenylene group, a 1,4-phenylene group, a 1,3-naphthylene group and a 1,4-naphthylene group.

Examples of the hydrocarbylene group as $R^{33}$ include a group in which 1 to 10 monomer units derived from a conjugated diene compound bonds to an alkanediyl group. Examples thereof include a group in which 1 to 10 monomer units derived from isoprene bonds to a methylene group, a group in which 1 to 10 monomer units derived from isoprene bonds to an ethylene group, and a croup in which 1 to 10 monomer units derived from isoprene bonds to a trimethylene group. In the group in which 1 to 10 monomer units derived from a conjugated diene compound bonds to an alkanediyl group, the conjugated diene compound is preferably isoprene and/or butadiene and the group preferably has 1 to 5 monomer units derived from the conjugated diene compound; the alkanediyl group is preferably a methylene group or a polymethylene group and the number of the carbon atoms of the alkanediyl group is preferably 1 to 6, more preferably 2 to 4, even more preferably 3.

The number of the carbon atoms of the hydrocarbylene group as $R^{33}$ preferably from 1 to 100, more preferably from 3 to 80, and even more preferably from 7 to 60.

The hydrocarbylene group as $R^{33}$ is preferably a group in which 1 to 10 monomer units derived from the conjugated diene compound bonds to an alkanediyl group, or an alkanediyl group, more preferably a group in which 1 to 10 monomer units derived from the conjugated diene compound consisting of butadiene or isoprene bonds to a methylene group or a polymethylene group, or a polymethylene group, even more preferably a group in which 1 to 10 monomer units derived from isoprene bonds to a polymethylene group having 2 to 4 carbon atoms, particularly preferably a group in which 1 to 5 monomer units derived from isoprene bonds to an ethylene group or a trimethylene group.

In Formula (3), m represents 0 or 1, preferably 1.

Of the compounds represented by Formula (3), examples of a compound in which m is 0 and $R^{31}$ and $R^{32}$ are hydrocarbyl groups include lithium dialkylamides such as lithium dimethylamide, lithium diethylamide, lithium ethylmethylamide, lithium di-n-propylamide, lithium diisopropylamide, lithium di-n-butylamide, lithium diisobutylamide, lithium di-sec-butylamide, lithium di-tert-butylamide, lithium di-n-hexylamide, lithium di-n-octylamide, and lithium dicyclohexylamide; lithium alkylarylamides such as lithium phenylmethylamide and lithium phenylethylamide; and lithium diarylamides such as lithium diphenylamide.

Of the compounds represented by Formula (3), examples of a compound in which m is 0 and at least one of $R^{31}$ and $R^{32}$ is substituted hydrocarbyl group include lithium di(alkoxyalkyl)amides such as lithium di(methoxymethyl)amide and lithium di(ethoxymethyl)amide; lithium bis(dialkylaminoalkyl)amides such as lithium bis(dimethylaminomethyl) amide; and trialkylsilylalkyl group-containing lithium amides such as trimethylsilylpropylmethylaminolithium.

Of the compounds represented by Formula (3), examples of a compound in which m is 0 and which has a hydrocarbylene group formed by the binding of $R^{31}$ and $R^{32}$ include lithium trimethyleneimide, lithium pyrrolidide, lithium piperidide, 2-methylpiperidinolithium, lithium hexamethyleneimide, lithium octamethyleneimide, lithium decamethyleneimide, lithium dodecamethyleneimide, 2-methylpiperidinolithium, 3-methylpiperidinolithium, 4-methylpiperidinolithium, 3,5-dimethylpiperidinolithium, and 1,2,3,6-tetrahydropyridyllithium.

Of the compounds represented by Formula (3), examples of a compound in which in is 0 and which has a hydrocarbylene group haying a nitrogen atom and/or an oxygen atom formed by the binding of $R^{31}$ and $R^{32}$ include 1-imidazolvilithium, 4,5-dihydro-1-imidazolyllithium, and 4-morpholinolithium.

Of the compounds represented by Formula (3), examples of a compound in which m is 1 and $R^{31}$ and $R^{32}$ are hydrocarbyl groups include 2-(N,N-dimethylamino)ethyllithium, 2-(N,N-diethylamino) ethyllithium, 3-(N,N-dimethylamino) propyllithium, and 3-(N,N-diethylamino)propyllithium. Examples of the compound also include a compound obtained by reacting the above-mentioned compound with a conjugated diene compound of an amount of from 1 mol to 10 mol per mol of the preceding compound.

Of the compounds represented by Formula (3), examples of a compound in which m is 1 and which has a hydrocarbylene group formed by the binding of $R^{31}$ and $R^{32}$ include 3-(1-pyrrolidinyl)propyllithium, 3-piperidinopropyllithium, and 3-(1-hexamethyleneimino)propyllithium. Examples of the compound also include a compound obtained by reacting the above-mentioned compound with a conjugated diene compound of an amount of from 1 mol to 10 mol per mol of the preceding compound.

Of the compounds represented by Formula (3), examples of a compound in which m is 1 and which has a hydrocarbylene group having a nitrogen atom and/or an oxygen atom formed by the binding of $R^{31}$ and $R^{32}$ include 3-(4-morpholino)propyllithium and 3-(1-imidazolyl)propyllithium. Examples of the compound also include a compound obtained by reacting the above-mentioned compound with a conjugated diene compound of an amount of from 1 mol to 10 mol per mol of the preceding compound.

The compound represented by Formula (3) is preferably a compound in which m is 1, $R^{33}$ is a group in which 1 to 10 monomer units derived from butadiene or isoprene bonds to a methylene group or a polymethylene group, or a polymethylene group, and $R^{31}$ and $R^{32}$ are alkyl groups, more preferably a compound in which m is 1, $R^{33}$ is a group in which 1 to 10 monomer units derived from isoprene bonds to a polymethylene group having 2 to 4 carbon atoms wherein the polymethylene group is bound to the nitrogen atom of Formula (3), $R^{31}$ and $R^{32}$ are each a linear alkyl group having 1 to 4 carbon atoms or are together a polymethylene group having 4 to 7 carbon atoms formed by the binding of $R^{31}$ and $R^{32}$, and more preferably a compound in which m is 1, $R^{33}$ is a group in which 1 to 5 monomer units derived from isoprene bonds to a trimethylene group wherein the trimethylene group is bound to the nitrogen atom of Formula (3), and $R^{31}$ and $R^{32}$ are each a linear alkyl group having 1 to 4 carbon atoms.

The compound represented by Formula (3) is particularly preferably a compound obtained by reacting a compound selected from the compound group consisting of 2-(N,N-dimethylamino) ethyllithium, 2-(N,N-diethylamino)ethyllithium, 3-(N,N-dimethylamino)propyllithium, and 3-(N,N-diethylamino)propyllithium with isoprene of an amount of 1 mol to 5 mol per mol of the preceding compound.

The compound represented by Formula (3) may be a compound produced in a solution containing monomer components.

In the above-described method (a), examples of the organoalkali metal compound having a nitrogen atom-containing group other than the compound represented by Formula (3) include 2,2,5,5-tetramethyl-1-(3-lithiopropyl)-1-aza-2,5-disilacyclopentane, 2,2,5,5-tetramethyl-1-(2-lithioethyl)-1-aza-2,5-disilacyclopentane, bis(dimethylamino)methylsilylmethyllithium, bis(dimethylamino)phenylsilylmethyllithium, bis(diethylamino)methylsilylmethyllithium, and bis(diethylamino)phenylsilylmethyllithium.

In the process (a), the amount of use of an organoalkali metal compound having a nitrogen atom-containing group to be used in polymerization of monomer components is preferably 0.01 mmol to 15 mmol per 100 g of monomer components to be used in polymerization.

In the above-mentioned method (b), examples of a preferred modifying agent having a nitrogen atom-containing group include a compound having both an amino group optionally having a substituent and a carbonyl group.

In the polymerization of the monomer components, respective monomer components may be fed in a plurality of times or all of them may be fed at once. In addition, respective monomers may be fed to a polymerization reactor at different times or alternatively may be fed at the same time.

Examples of the method of feeding the compound represented by Formula (1) in the polymerization of monomer components include the following method. That is a method in which when the amount of the compound represented by Formula (1) to be used is taken as 100% by weight, from 10% by weight to 40% by weight of the compound represented by Formula (1) is fed into a hydrocarbon solvent before the degree of progress of polymerization exceeds 15%, from 40% by weight to 70% by weight of the compound represented by Formula (1) is fed into a hydrocarbon solvent before the degree of progress of polymerization exceeds 30%, and from 70% by weight to 100% by weight of the compound represented by Formula (1) is fed into a hydrocarbon solvent before the degree of progress of polymerization exceeds 90%. A conjugated diene-based polymer composition superior in gripping properties and fully satisfactory in tensile elongation at break can be obtained by using the conjugated diene-based polymer obtained according to the method described above. In the present specification, the degree of progress of polymerization is defined to be the ratio of the weight average molecular weight of the conjugated diene-based polymer at a certain time point in polymerization to the weight average molecular weight of the conjugated diene-based polymer finally obtained.

In the polymerization of the monomer components, the polymerization temperature is usually 25° C. or higher, preferably 35° C. or higher, more preferably 50° C. or higher. It is usually 100° C. or lower, preferably 90° C. or lower, more preferably 80° C. or lower. The polymerization time is usually from 10 minutes to 5 hours.

The conjugated diene-based polymer may be a polymer which has been coupled with a coupling agent. The coupled polymer is usually obtained by adding a coupling agent to a polymer solution obtained by polymerizing monomer components containing a conjugated diene compound, a compound represented by Formula (1), and a compound represented by Formula (2) to react them. When a conjugated diene-based polymer having a nitrogen atom-containing group on at least one of polymer chain ends is produced by the above-described method (b), the addition of the coupling agent is usually performed before adding the modifying agent having a nitrogen atom-containing group to a polymerization solution. Examples of the coupling agent include a compound represented by the following Formula (4)

$$R^{41}{}_aML_{4-a} \qquad (4)$$

wherein $R^{41}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by Formula (4) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent to be added per mol of the organometallic compound used for the polymerization is preferably 0.03 mol or more, more preferably 0.05 mol or more, and it is preferably 0.4 mol or less, more preferably 0.3 mol or less.

In the conjugated diene-based polymer, an active end of the polymer chain may have been inactivated with an alcohol or the like. Examples of a method of the inactivation include a method of adding an alcohol to a polymerization solution obtained by polymerizing monomer components containing a conjugated diene-based compound, a compound represented by Formula (1), and a compound represented by Formula (2). As the alcohol, methanol, 1-butanol, etc. can be used.

When the conjugated diene-based polymer is recovered from the polymerization solution, the conjugated diene-based polymer can be recovered from the polymerization solution by a known method such as a method of adding a coagulating agent to the polymerization solution, or a method of adding steam to the polymerization solution. The recovered conjugated diene-based polymer may be dried with a known drier such as a band drier or an extrusion-type drier.

The conjugated diene-based polymer obtained by polymerization conducted in a hydrocarbon solvent may be subjected to a step of the reaction with an organometallic compound described below, in the state of a polymerization solution.

<Reaction Between Conjugated Diene-Based Polymer and Organometallic Compound>

The modified conjugated diene-based polymer of the present invention is obtained by reacting a conjugated diene-based polymer with an organometallic compound, and then reacting an epoxy compound with the resulting product.

The reaction between the conjugated diene-based polymer and the organometallic compound is performed preferably in a hydrocarbon solvent. As the hydrocarbon solvent, there can be used the hydrocarbon solvents provided above as examples of the hydrocarbon solvent to be used for the polymerization.

In one possible embodiment, the conjugated diene-based polymer is dissolved in the hydrocarbon solvent, the organometallic compound is then added to the resulting solution, and the conjugated diene-based polymer and the organometallic compound are reacted with each other. When the conjugated diene-based polymer obtained by the polymerization performed in the hydrocarbon solvent is used in the state of a polymerization solution, the organometallic compound may be added to the polymerization solution to react the conjugated diene-based polymer with the organometallic compound.

Examples of the organometallic compound to be reacted with the conjugated diene-based polymer include organoalkali metal compounds such as an organolithium compound, an organosodium compound, and an organopotassium compound. Examples of the organolithium compound include a hydrocarbyllithium compound. Examples of the organosodium compound include sodium naphthalenide and sodium biphenylide. Examples of the organopotassium compound include potassium naphthalenide.

Examples of the hydrocarbyllithium compound include alkyllithium compounds such as ethyllithium, propyllithium, isopropyllithium, n-butyllithium, isobutyllithium, sec-butyllithium, tert-butyllithium, tert-octyllithium, and n-decyllithium; aryllithium compounds such as phenyl lithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllithium, even more preferably sec-butyllithium.

The organometallic compound to be reacted with the conjugated diene-based polymer may be either the same as or different from the organometallic compound used in the polymerization.

In the step of reacting the conjugated diene-based polymer with the organometallic compound, the amount of the organometallic compound added per 100 g of the conjugated diene-based polymer is preferably 20 mmol or less, more preferably 8 mmol or less, and is preferably 0.5 mmol or more.

When the conjugated diene-based polymer is a conjugated diene-based polymer obtained by using a hydrocarbyllithium compound as the organometallic compound, the amount of the organometallic compound to be added for reacting with the polymer is preferably 1 mmol or more, more preferably 2 mmol or more, and is preferably 8 mmol or less, more preferably 4 mmol or less, per 100 g of the conjugated diene-based polymer.

When the conjugated diene-based polymer is a conjugated diene-based polymer obtained by using an organoalkali metal compound having a nitrogen atom-containing group at the organometallic compound, and adding an alcohol to a polymer solution containing a conjugated diene-based polymer obtained by polymerization to inactivate an active end of the polymer chain, the amount of the organometallic compound to be added for reacting with the polymer is preferably 1 mmol or more, more preferably 2 mmol or more, and is preferably 8 mmol or less, more preferably 4 mmol or less, per 100 g of the conjugated diene-based polymer.

When the conjugated diene-based polymer is a conjugated diene-based polymer obtained by using an organoalkali metal compound having a nitrogen atom-containing group as the organometallic compound, and adding a modifying agent having a nitrogen atom-containing group to a polymerization solution containing a conjugated diene-based polymer obtained by polymerization to react the modifying agent with an active end of the polymer chain, the amount of the organometallic compound to be added for reacting with the polymer is preferably 0.5 mmol or more, more preferably 1 mmol or more, and is preferably 3 mmol or less, more preferably 2.5 mmol or less, per 100 g of the conjugated diene-based polymer, so as to enhance fuel economy and tensile elongation at break.

The reaction between the conjugated diene-based polymer with the organometallic compound is performed preferably in the presence of one or more compounds (hereinafter sometimes referred to as compound (X)) selected from the compound group consisting of an ether compound, a tertiary amine, a phosphine compound, an alkali metal alkoxide, and an alkali metal phenoxide, more preferably in the presence of a tertiary amine. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, and ethylene glycol dibutyl ether; aliphatic triethers such as diethylene glycol diethyl ether and diethylene glycol dibutyl ether; and aromatic ethers such as diphenyl ether and anisole. The ether compound is preferably a cyclic ether or an aliphatic diether, more preferably tetrahydrofuran or ethylene glycol diethyl ether. Examples of the tertiary amine include triethylamine, tripropylamine, tributylamine, 1,1,2,2-tetramethylethylenediamine, N,N-diethylaniline, N,N,N',N'',N''-pentamethyldiethylenetriamine, 1,1,4,7,10,10-hexamethyltriethylenetetramine, (−)-sparteine, pyridine, and quinoline. The tertiary amine is preferably 1,1,2,2-tetramethylethylenediamine. Examples of the phosphine compound include trimethylphosphine, triethylphosphine, and triphenylphosphine. Examples of the alkali metal alkoxide include sodium tert-butoxide, potassium tert-butoxide, sodium tert-pentoxide, and potassium tert-pentoxide. Examples of the alkali metal phenoxide include sodium phenoxide and potassium phenoxide. The amount of the compound (X) to be added per mol of the organometallic compound is preferably from 0.1 mol to 10 mol.

The compound (X) may be added to a conjugated diene-based polymer solution after it is mixed with the organometallic compound in advance, or the compound (X) and the organometallic compound may be added sequentially to the conjugated diene-based polymer solution.

The temperature at which the conjugated diene-based polymer is reacted with the organometallic compound is preferably 40° C. or higher, more preferably 50° C. or higher. It is preferably 90° C. or lower, more preferably 80° C. or lower.

The time during which the conjugated diene-based polymer is reacted with the organometallic compound is preferably 10 seconds or longer, more preferably 1 minute or longer. It is preferably 150 minutes or shorter, more preferably 50 minutes or shorter.

<Reaction with Epoxy Compound>

An epoxy compound is reacted with a product obtained by reacting a conjugated diene-based polymer with an organometallic compound.

The reaction of the product with the epoxy compound is performed preferably in a hydrocarbon solvent. As the hydrocarbon solvent, there can be used the hydrocarbon solvents provided above as examples of the hydrocarbon solvent to be used for polymerization.

In the reaction of the product with the epoxy compound, preferably, the epoxy compound is added to a solution containing the product produced by reacting the conjugated diene-based polymer with the organometallic compound and then the product is reacted with the epoxy compound.

Examples of preferred epoxy compound include an epoxy compound having a hydrocarbyloxysilyl group.

Examples of the epoxy compound having a hydrocarbyloxysilyl group include
2-glycidyloxyethyltrimethoxysilane,
3-glycidyloxypropyltrimethoxysilane,
4-glycidyloxybutyltrimethoxysilane,
3-glycidyloxypropyltriethoxysilane,
3-glycidyloxypropyltripropoxysilane,
3-glycidyloxypropylmethyldimethoxysilane,
3-glycidyloxypropylmethyldiethoxysilane,
3-glycidyloxypropylmethyldipropoxysilane,
3-glycidyloxypropylethyldimethoxysilane,
3-glycidyloxypropylethyldiethoxysilane,
3-glycidyloxypropylethyldipropoxysilane,
3-glycidyloxypropyldimethylmethoxysilane,
3-glycidyloxypropyldimethylethoxysilane,
3-glycidyloxypropyldimethylpropoxysilane,
3-glycidyloxypropyldiethylmethoxysilane,
3-glycidyloxypropyldiethylethoxysilane,
3-glycidyloxypropyldiethylpropoxysilane,
bis(3-glycidyloxypropyl)dimethoxysilane,
bis(3-glycidyloxypropyl)diethoxysilane,
bis(3-glycidyloxypropyl)dipropoxysilane,
bis(3-glycidyloxypropyl)methylmethoxysilane, bis(3-glycidyloxypropyl)methylethoxysilane,
bis(3-glycidyloxypropyl)ethylmethoxysilane,
bis(3-glycidyloxypropyl)ethylethoxysilane,
tris(3-glycidyloxypropyl)methoxysilane, and
tris(3-glycidyloxypropyl)ethoxysilane.

The epoxy compound having a hydrocarbyloxysilyl group is preferably 3-glycidyloxypropyltrimethoxysilane.

The amount of the epoxy compound to be used is preferably 0.5 mmol or more, more preferably 1 mmol or more, per 100 g of the conjugated diene-based polymer. It is preferably 25 mmol or less, more preferably 10 mmol or less, even more preferably 5 mmol or less.

The temperature at which a product obtained by reacting the conjugated diene-based polymer with the organometallic compound is reacted with the epoxy compound is preferably 25° C. or higher, more preferably 35° C. or higher, further preferably 50° C. or higher. It is preferably 100° C. or lower, more preferably 90° C. or lower, even more preferably 80° C. or lower.

The time during which a product obtained by reacting the conjugated diene-based polymer with the organometallic compound is reacted with the epoxy compound is preferably 60 seconds or longer, more preferably 5 minutes or longer. It is preferably 5 hours or shorter, more preferably 1 hour or shorter.

Preferably, the method for producing a modified conjugated diene-based polymer of the present invention has a step of obtaining a polymerization solution containing a conjugated diene-based polymer by a step of polymerizing monomer components containing a conjugated diene compound, a compound represented by Formula (1), and a compound represented by Formula (2) using an organometallic compound in a hydrocarbon solvent, and adding an organometallic compound to the resulting polymerization solution to react the conjugated diene-based polymer with the organometallic compound, and a step of adding a hydrocarbyloxysilane compound to a solution containing the product obtained in the foregoing step to react the product with the hydrocarbyloxysilane compound.

As a method for recovering the resulting modified conjugated diene-based polymer, a known method may be used, and examples thereof include a method of adding a coagulating agent to a solution containing a conjugated diene-based polymer, and a method of adding steam to a solution containing a conjugated diene-based polymer. The modified conjugated diene-based polymer recovered may be dried with a known drier such as a band drier or an extrusion-type drier.

[Modified Conjugated Diene-Based Polymer]

The Mooney viscosity ($ML_{1+4}$) of the modified conjugated diene-based polymer is preferably 10 or more, more preferably 20 or more in order to enhance tensile strength at break. In order to improve processability, it is preferably 200 or less, more preferably 150 or less. The Mooney viscosity ($ML_{1+4}$) is measured at 100° C. in accordance with JIS K6300 (1994).

The molecular weight distribution of the modified conjugated diene-based polymer is preferably from 1 to 5, more preferably from 1 to 2, in order to improve fuel economy. The molecular weight distribution is determined by measuring the number average molecular weight (Mn) and the weight average molecular weight (Mw) of the modified conjugated diene-based polymer by gel permeation chromatography (GPC), and then dividing Mw by Mn.

In order to improve fuel economy, the amount of vinyl bonds in the modified conjugated diene-based polymer is preferably 80% by mol or less, more preferably 70% by mol or less where the content of a monomer unit derived from a conjugated diene is taken as 100% by mol. In order to enhance gripping properties, the amount of vinyl bonds is preferably 10 mol % or more, more preferably 15 mol % or more, even more preferably 20 mol % or more, particularly preferably 40 mol % or more. The amount of vinyl bonds is determined from the absorption intensity at around 910 $cm^{-1}$, which is an absorption peak of a vinyl group, by infrared spectroscopy.

[Polymer Composition]

A polymer composition can be obtained by kneading a modified conjugated diene-based polymer with a polymer component different than the modified conjugated diene-based polymer, an additive, etc.

Examples of the polymer component different than the modified conjugated diene-based polymer include a styrene-butadiene copolymer, polybutadiene, a butadiene-isoprene copolymer, butyl rubber, natural rubber, an ethylene-propylene copolymer, and an ethylene-octene copolymer. Two or more polymer components different than the modified conjugated diene-based polymer may be used.

In the case of incorporating to a modified conjugated diene-based polymer a polymer component different than the modified conjugated diene-based polymer, the amount of the modified conjugated diene-based polymer to be incorporated is preferably 10% by weight or more, more preferably 20% by weight or more, where the total amount of the modified conjugated diene-based polymer and the polymer component different than the modified conjugated diene-based polymer is taken as 100% by weight, in order to enhance fuel economy. Hereafter, a modified conjugated diene-based polymer and a polymer component different than the modified conjugated diene-based polymer are sometimes collectively called polymer components.

Examples of the additive include a vulcanizing agent, a vulcanization accelerator, a vulcanization activator, an organic peroxide, a reinforcing agent, a filler, a silane coupling agent, an extending oil, a processing aid, an antiaging agent, and a lubricant.

Examples of the vulcanizing agent include sulfur. Examples of sulfur include powdery sulfur, precipitated sulfur, colloidal sulfur, insoluble sulfur, and highly-dispersible sulfur. The amount of the vulcanizing agent to be blended is preferably from 0.1 parts by weight to 15 parts by weight, more preferably from 0.3 parts by weight to 10 parts by weight, even more preferably from 0.5 parts by weight to 5 parts by weight per 100 parts by weight of the polymer components.

Examples of the vulcanization accelerator include thiazole-based vulcanization accelerators, such as 2-mercaptobenzothiazole, dibenzothiazyldisulfide, and N-cyclohexyl-2-benzothiazylsulfenamide; thiuram-based vulcanization accelerators, such as tetramethylthiurammonosuffide and tetramethylthiuramdisulfide; sulfenamide-based vulcanization accelerators, such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators, such as diphenylguanidine, diorthotolylguanidine, and orthotolylbiguanidine. The amount of the vulcanization accelerator to be blended is preferably 0.1 parts by weight to 5 parts by weight, more preferably 0.2 parts by weight to 3 parts by weight per 100 parts by weight of the polymer components.

Examples of the vulcanization activator include stearic acid and zinc oxide. Examples of the organic peroxide include dicumyl peroxide and di-tert-butyl peroxide.

Examples of the reinforcing agent include a silica-based reinforcing agent and carbon black.

Examples of the silica-based reinforcing agent include dry silica (anhydrous silicic acid), wet silica (hydrous silicic acid), colloidal silica, precipitated silica, calcium silicate, and aluminum silicate. One or more members thereof may be used. The BET specific surface area of the silica-based reinforcing agent is preferably from 50 m$^2$/g to 250 m$^2$/g. The BET specific surface area is measured in accordance with ASTM D1993-03. As a commercially available product, there can be used, for example, a product available under the commercial name of Ultrasil VN3-G produced by Degussa GmbH, products available under the commercial names of VN3, AQ, ER, and RS-150 produced by Tosoh Silica Corporation, and products available under the commercial names of Zeosil 1115MP and Zeosil 1165 MP produced by Rhodia.

Examples of the carbon black include channel carbon black such as EPC, MPC, and CC; furnace carbon black, such as SAF, ISAF, HAF, MAF, FEF, SRF, GPF, APF, FF, CF, SCF, and ECF; thermal carbon black, such as FT and MT; acetylene carbon black; and graphite. One or more members thereof may be used.

The nitrogen adsorption specific surface area (N$_2$SA) of carbon black is preferably from 5 m$^2$/g to 200 m$^2$/g, and the dibutyl phthalate (DBP) absorption amount of carbon black is preferably from 5 ml/100 g to 300 l/100 g. The nitrogen adsorption specific surface area is measured in accordance with ASTM D4820-93 and the DBP absorption amount is measured in accordance with ASTM D2414-93. As a commercially available product, a product available under the commercial name of DIABLACK N339 produced by Mitsubishi Chemical Corporation, products available under the commercial names of SEAST 6, SEAST 7HM, and SEAST KH produced by Tokai Carbon Co., Ltd., and products available under the commercial names of CK 3 and Special Black 4A produced by Degussa GmbH can be used.

When a polymer composition is produced by incorporating a reinforcing agent in a modified conjugated diene-based polymer, the amount of the reinforcing agent to be incorporated is preferably from 10 parts by weight to 150 parts by weight per 100 parts by weight of a conjugated diene-based polymer. In order to enhance abrasion resistance and strength, the amount to be incorporated is more preferably 20 parts by weight or more, even more preferably 30 parts by weight or more. In terms of the dispersibility of the reinforcing agent, the amount to be incorporated is more preferably 120 parts by weight or less, even more preferably 100 parts by weight or less.

When a polymer composition is produced by incorporating a reinforcing agent in a modified conjugated diene-based polymer, it is preferred to use a silica-based reinforcing agent as the reinforcing agent in order to enhance fuel economy. The amount of the silica-based reinforcing agent to be incorporated is preferably 50% by weight or more, more preferably 70% by weight or more where the amount of all reinforcing agents to be incorporated is taken as 100% by weight.

It is preferred to use a silica-based reinforcing agent and carbon black as reinforcing agents. The weight ratio of the silica-based reinforcing agent to the carbon black in the reinforcing agents (the content of silica-based reinforcing agent: the content of carbon black) is preferably from 2:1 to 50:1. In order to enhance fuel economy and enhance reinforcing properties, the weight ratio is more preferably from 5:1 to 20:1.

Examples of the filler include calcium carbonate, talc, alumina, clay, aluminum hydroxide, and mica.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyltetrasulfide, and γ-trimethoxysilylpropylbenzothiazyltetrasulfide. One or more members of these are used. As a commercially available product, products available under commercial names of Si69 and Si75 produced by Degussa GmbH can be used.

When a polymer composition is produced by incorporating a silica-based reinforcing agent and a silane coupling agent in a modified conjugated diene-based polymer, the amount of the silane coupling agent to be incorporated is preferably from 1 part by weight to 20 parts by weight, more preferably from 2 parts by weight to 15 parts by weight, even more preferably from 5 parts by weight to 10 parts by weight per 100 parts by weight of the silica-based reinforcing agent.

Examples of the extending oil include aromatic mineral oils (viscosity-gravity constant (V.G.C.): from 0.900 to 1.049), naphthene-based mineral oils (V.G.C.: from 0.850 to 0.899), and paraffin-based mineral oils (V.G.C.: from 0.790 to 0.849). The content of a polycyclic aromatic compound in the extending oil is preferably less than 3% by weight, more preferably less than 1% by weight. The content of the polycyclic aromatic compound is measured in accordance with the IP 346/92 method of The Institute of Petroleum. The content of aromatic compounds (CA) of the extending oil is preferably 20% by weight or more. Two or more extending oils may be used.

Examples of a method for producing a polymer composition by incorporating to a modified conjugated diene-based polymer a polymer component other than the modified conjugated diene-based polymer, an additive, etc. include a method of kneading them by using a kneading machine. Examples of the kneading machine include a roll kneading machine and a Banbury mixer.

As far as the kneading conditions be concerned, when an additive other than a vulcanizing agent is incorporated, the kneading temperature is usually from 50° C. to 200° C., preferably from 80° C. to 190° C., and when a vulcanizing agent is incorporated, the kneading temperature is usually 100° C. or lower, preferably from room temperature to 80° C. The kneading time is usually from 30 seconds to 30 minutes, preferably from 1 minute to 30 minutes. A composition with a vulcanizing agent incorporated therein is usually used after being subjected to vulcanization treatment such as press vulcanization. The vulcanization temperature is usually from 120° C. to 200° C., preferably from 140° C. to 180° C.

Polymer compositions obtained in the present invention are superior in fuel economy and gripping properties and are suitably used for tires.

EXAMPLES

Evaluation of physical properties was performed by the following methods.

1. Mooney Viscosity (ML$_{1+4}$)

In accordance with JIS K6300 (1994), the Mooney viscosity of a polymer was measured at 100° C.

2. Amount of Vinyl Bonds (Unit: mol %)

The amount of the vinyl bonds in a polymer was determined from the absorption intensity at around 910 cm$^{-1}$, which is an absorption peak of a vinyl group, by infrared spectroscopy.

3. Content of Monomer Units Derived from Styrene (Unit: % by Weight)

The content of the monomer units derived from styrene in a polymer was determined from a refractive index in accordance with JIS K6383 (1995)

4. Molecular Weight Distribution (Mw/Mn)

The weight average molecular weight (Mw) and the number average molecular weight (Mn) of a polymer were measured by a gel permeation chromatograph (GPC) method under the following conditions (1) to (8), and the molecular weight distribution (Mw/Mn) of the polymer was determined.

(1) Apparatus: HLC-8220 manufactured by Tosoh Corporation (2) Separation column: TSKgel SuperHM-H (two columns in series) manufactured by Tosoh Corporation (3) Measuring temperature: 40° C.

(4) Carrier: tetrahydrofurarl (5) Flow rate: 0.6 mL/min (6) injection amount: 5 μL (7) Detector: differential refractometer (8) Molecular weight standard: standard polystyrene 5. Content of Monomer Units Derived from 4-Methylstyrene (Unit: % by Weight)

The content of the monomer units derived from 4-methylstyrene in a polymer was determined by a gas chromatograph-mass spectrometer (GC-MS) method under the following conditions (1) to (5).

(1) Apparatus: GCMS-QP2010 Plus manufactured by Shimadzu Corporation (2) Column: Agilent J&W DB-5 ms, 30 m×0.25 mm i.d., membrane thickness 0.25 μm (3) Temperature conditions: 40° C. (2 minutes)–10° C./min–320° C. (5 minutes)

(4) Ionizing method: electron ionization (EI method: 70 eV)

(5) Measuring method: selected ion monitoring (SIM)

6. Fuel Economy

A strip of 4 mm in width, 40 mm in length and 1.2 mm in thickness was punched out from a vulcanized sheet and was subjected to a test. The loss tangent (tan δ (70° C.)) of the strip at a temperature of 70° C. was measured under the condition represented by a strain of 1% and a frequency of 10 Hz by using a viscoelasticity analyzer (manufactured by Ueshima Seisakusho Co., Ltd.). The smaller this value, the better the fuel economy is.

7. Gripping Property

A strip of 4 mm in width, 40 mm in length and 1.2 mm in thickness was punched out from a vulcanized sheet and was subjected to a test. The loss tangent (tan δ (0° C.)) of the strip at a temperature of 0° C. was measured under the condition represented by a strain of 2.5% and a frequency of 10 Hz by using a viscoelasticity analyzer (manufactured by Ueshima Seisakusho Co., Ltd.). The larger this value, the better the gripping property is.

Example 1

A polymerization reactor made of stainless steel equipped with a stirring device and having an internal volume of 20 L was washed, dried, and flushed with dry nitrogen. Subsequently, 10.2 kg of industrial hexane (density 680 kg/m$^3$), 608 g of 1,3-butadiene, 192 g of styrene, 1.51 g of 4-methylstyrene, 6.1 ml of tetrahydrofuran, and 3.9 ml of ethylene glycol diethyl ether were charged into the polymerization reactor. Subsequently, a solution of n-butyllithium in n-hexane (n-butyllithium content 12.8 mmol) was charged into the polymerization reactor and then a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours while 1,3-butadiene and styrene were continuously fed to the polymerization reactor. The fed amount of 1,3-butadiene was 912 g, and the fed amount of styrene was 288 g.

After 20 minutes from the polymerization initiation, 20 mL of a solution containing 1.51 g of 4-methylstyrene in hexane was rapidly charged into the polymerization reactor at a polymerization temperature of 65° C. and a stirring rate of 130 rpm.

After 40 minutes from that (after 60 minutes from the polymerization initiation), 20 ml of a solution containing 1.51 g of 4-methylstyrene in hexane was rapidly charged into the polymerization reactor at a polymerization temperature of 65° C. and a stirring rate of 130 rpm.

After 2 hours from that (after 3 hours from the polymerization initiation), 12.8 mmol of 1-butanol was added to the polymer solution, followed by stirring for 15 minutes.

Subsequently, a solution of sec-butyllithium in cyclohexane (sec-butyllithium content 64.0 mmol), and 11.5 ml of 1,1,2,2-tetramethylethylenediamine were charged into the polymerization reactor, followed by stirring for 30 minutes.

Further, 64.0 mmol of 3-glycidyloxypropyltrimethoxysilane was added, followed by stirring for 15 minutes.

To the polymer solution was added 20 ml of a solution containing 3.0 ml of methanol in hexane, and the polymer solution was stirred for 5 minutes. Subsequently, to the polymer solution were added 8.0 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 4.0 g of pentaerythrityltetrakis(3-laurylthiopropionate) (trade name: Sumilizer TP-D produced by Sumitomo Chemical Co., Ltd.), subsequently the solvent in the polymer solution was evaporated at normal temperature for 24 hours to afford a polymer. Thereafter, the resulting polymer was dried at 55° C. for 12 hours under reduced pressure. Evaluation results of the polymer are shown in Table 1.

Subsequently, 100 parts by weight of the polymer, 78.4 parts by weight of silica (trade name: Ultrasil VN3-G produced by Degussa GmbH), 6.4 parts by weight of a silane coupling agent (trade name: Si69 produced by Degussa GmbH), 6.4 parts by weight, of carbon black (trade name: DIABLACK N339 produced by Mitsubishi Chemical Corporation) 47.6 parts by weight of an extending oil (trade name: JOMO Process NC-140 produced by Japan Energy Corporation), 1.5 parts by weight of an antiaging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CZ produced by Sumitomo Chemical Co., Ltd.), 1 part by weight of a vulcanization accelerator (trade name: Soxinol D produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was vulcanized by heating it at 160° C. for 45 minutes, thereby to prepare a vulcanized sheet. The results of physical property evaluation of the vulcanized sheet are shown in Table 1.

Example 2

A polymerization reactor made of stainless steel equipped with a stirring device and having an internal volume of 20 L was washed, dried, and flushed with dry nitrogen. Subsequently, 10.2 kg of industrial hexane (density 680 kg/m$^3$), 608 g of 1,3-butadiene, 192 g of styrene, 1.51 g of 4-methylstyrene, 6.1 ml of tetrahydrofuran, and 3.9 ml of ethylene glycol diethyl ether were charged into the polymerization reactor. Subsequently, a solution in cyclohexane of 6.7 mmol of a compound obtained by reacting 3-(N,N-dimethylamino)-1-propyllithium with isoprene [reaction ratio:isoprene/3-(N,N-dimethylamino) propyllithium=2/1 (in molar ratio), AI-200CE2 produced by FMC (solution in cyclohexane)] and a solution of n-butyllithium in n-hexane (n-butyllithium content 6.7 mmol) were charged into the polymerization reactor, and then a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours while 1,3-butadiene and styrene were continuously fed to the polymerization reactor. The fed amount of 1,3-butadiene was 912 g, and the fed amount of styrene was 288 g.

After 20 minutes from the polymerization initiation, 20 mL of a solution containing 1.51 g of 4-methylstyrene in hexane was rapidly charged into the polymerization reactor at a polymerization temperature of 65° C. and a stirring rate of 130 rpm.

After 40 minutes from that (after 60 minutes from the polymerization initiation), 20 ml of a solution containing 1.51 g of 4-methylstyrene in hexane was rapidly charged into the polymerization reactor at a polymerization temperature of 65° C. and a stirring rate of 130 rpm.

After 2 hours from that (after 3 hours from the polymerization initiation), 13.4 mmol of 1-butanol was added to the polymer solution, followed by stirring for 15 minutes.

Subsequently, a cyclohexane solution of sec-butyllithium (sec-butyllithium content 38.4 mmol), and 6.9 ml of 1,1,2,2-tetramethylethylenediamine were placed into the polymerization reactor, followed by stirring for 30 minutes.

Further, 38.4 mmol of 3-glycidyloxypropyltrimethoxysilane was added, followed by stirring for 15 minutes.

To the polymer solution was added 20 ml of a solution containing 3.0 ml of methanol in hexane, and the polymer solution was stirred for 5 minutes. Subsequently, to the polymer solution were added 8.0 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 4.0 g of pentaerythrityltetrakis(3-laurylthiopropionate) (trade name: Sumilizer TP-D produced by Sumitomo Chemical Co., Ltd.), subsequently the solvent in the polymer solution was evaporated at normal temperature for 24 hours to afford a polymer. Thereafter, the resulting polymer was dried at 55° C. for 12 hours under reduced pressure. Evaluation results of the polymer are shown in Table 1.

Subsequently, 100 parts by weight of the polymer, 78.4 parts by weight of silica (trade name: Ultrasil VN3-G produced by Degussa GmbH), 6.4 parts by weight of a si lane coupling agent (trade name: Si69 produced by Degussa GmbH), 6.4 parts by weight of carbon black (trade name: DIABLACK N339 produced by Mitsubishi Chemical Corporation), 47.6 parts by weight of an extending oil (trade name: JOMO Process NC-140 produced by Japan Energy Corporation), 1.5 parts by weight of an anti aging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CZ produced by Sumitomo Chemical Co., Ltd.), 1 part by weight of a vulcanization accelerator (trade name: Soxinol D produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was vulcanized by heating it at 160° C. for 45 minutes, thereby to prepare a vulcanized sheet. The results of physical property evaluation of the vulcanized sheet are shown in Table 1.

Comparative Example 1

A polymerization reactor made of stainless steel equipped with a stirring device and having an internal volume of 5 L was washed, dried, and flushed with dry nitrogen. Subsequently, 2.55 kg of industrial hexane (density 680 kg/m$^3$), 137 g of 1,3-butadiene, 43 g of styrene, 1.52 ml of tetrahydrofuran, and 1.09 ml of ethylene glycol diethyl ether were charged into the polymerization reactor. Subsequently, a solution of n-butyllithium in n-hexane (n-butyllithium content 3.36 mmol was charged into the polymerization reactor, and then a polymerization reaction was initiated.

A copolymerization reaction of 1,3-butadiene and styrene was performed at a temperature in the polymerization reactor of 65° C. and a stirring rate of 130 rpm for 2 hours and 30 minutes while 1,3-butadiene and styrene were continuously fed to the polymerization reactor. The fed amount of 1,3-butadiene was 205 g, and the fed amount of styrene was 65 g.

To the polymer solution was added 5 ml of a solution containing 0.21 ml of 1-butanol in hexane, and the polymer solution was stirred for 15 minutes.

Subsequently, a solution of sec-butyllithium in cyclohexane (sec-butyllithium content 14.4 mmol), and 2.59 ml (17.4 mmol) of 1,1,2,2-tetramethylethylenediamine were charged into the polymerization reactor, followed by stirring for 30 minutes.

Further, 14.4 mmol of [3-(diethylamino)propyl]trimethoxysilane was added, followed by stirring for 15 minutes.

To the polymer solution was added 5 ml of a solution containing 1.0 ml of methanol in hexane, and the polymer solution was stirred for 5 minutes. Subsequently, to the polymer solution were added 1.8 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 0.9 g of pentaerythrityltetrakis(3-laurylthiopropionate) (trade name: Sumilizer TP-D produced by Sumitomo Chemical Co., Ltd.), the polymer solution was then allowed to stand at room temperature for 16 hours, and the solvent in the polymer solution was evaporated to afford a polymer. Thereafter, the resulting polymer was dried at 55° C. for 6 hours under reduced pressure. Evaluation results of the polymer are shown in Table 1.

Subsequently, 100 parts by weight of the resulting polymer, 78.4 parts by weight of silica (trade name: Ultrasil VN3-G produced by Degussa GmbH), 6.4 parts by weight of a silane coupling agent (trade name: Si69 produced by Degussa GmbH), 6.4 parts by weight of carbon black (trade name: DIABLACK N339 produced by Mitsubishi Chemical Corporation), 47.6 parts by weight of an extending oil (trade name: JOMO Process NC-140 produced by Japan Energy Corporation), 1.5 parts by weight of an antiaging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CS produced by Sumitomo Chemical Co., Ltd.), 1 part by weight of a vulcanization accelerator (trade name: Soxinol C produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was vulcanized by heating it at 160° C. for 45 minutes, thereby to prepare a vulcanized sheet of 150 mm in width, 150 mm in length, and 1.2 mm in thickness. The results of physical property evaluation of the vulcanized sheet are shown in Table 1.

TABLE 1

|  |  | Example 1 | Example 2 | Comparative Example 1 |
|---|---|---|---|---|
| Mooney viscosity | — | 50.9 | 39.6 | 43.1 |
| Amount of vinyl bonds | mol % | 55.2 | 56.2 | 56.7 |
| Content of monomer units derived from styrene | % by weight | 25.1 | 25.1 | 23.1 |
| Content of monomer units derived from 4-methylstyrene | % by weight | 0.20 | 0.21 | — |
| Fuel economy tanδ (70° C.) | — | 0.128 | 0.138 | 0.205 |
| Gripping property tanδ (0° C.) | — | 0.674 | 0.719 | 0.636 |

What is claimed is:

1. A method for producing a modified conjugated diene-based polymer, the method comprising:
    a step of reacting a conjugated diene-based polymer having monomer units derived from a conjugated diene compound, monomer units derived from a compound represented by Formula (1) and monomer units derived from a compound represented by Formula (2), with an organometallic compound, and
    a step of reacting the resulting product and an epoxy compound,
    wherein the conjugated diene-based polymer comprises the monomer units derived from the compound represented by Formula (1) in a content of from 0.01% by weight to 1% by weight where the total amount of all the monomer units contained in the conjugated diene-based polymer is taken as 100% by weight;

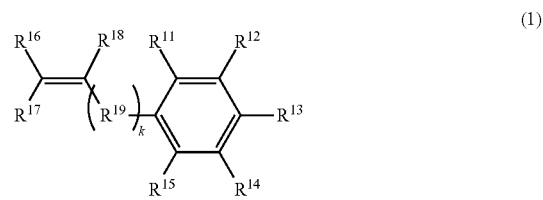

wherein $R^{11}$, $R^{12}$, $R^{13}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$ $R^{17}$ and $R^{18}$ each independently represent a hydrogen atom or a hydrocarbyl group; $R^{19}$ represents a hydrocarbylene group; k is 0 or 1,

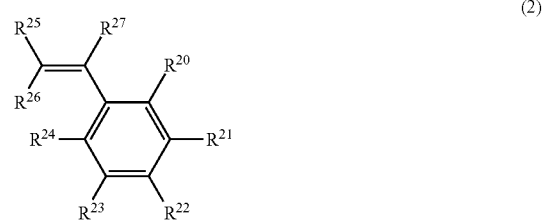

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $R^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group.

2. The method according to claim 1, wherein the epoxy compound has a hydrocarbyloxysilyl group.

3. A method for producing a polymer composition, the method comprising a step of kneading 100 parts by weight of a modified conjugated diene-based polymer produced by the method according to claim 2 with from 10 to 150 parts by weight of a reinforcing agent.

4. A method for producing a polymer composition, the method comprising a step of kneading 100 parts by weight of a modified conjugated diene-based polymer produced by the method according to claim 1 with from 10 to 150 parts by weight of a reinforcing agent.

* * * * *